May 6, 1952 P. K. WEIMER 2,595,553

COLOR TELEVISION SYSTEM

Filed Oct. 30, 1947

INVENTOR
Paul K. Weimer
BY [signature]
ATTORNEY

Patented May 6, 1952

2,595,553

UNITED STATES PATENT OFFICE 2,595,553

COLOR TELEVISION SYSTEM

Paul K. Weimer, Princeton, N. J., assignor to Radio Corporation of America, a corporation of Delaware Application October 30, 1947, Serial No. 783,087

6 Claims. (Cl. 178—5.2)

This invention relates to television image pickup devices and more particularly to color television cameras suitable for employment in the simultaneous type color television system.

It is well known and has become the general practice that transmission of images by electricity may be accomplished by analyzing the image into its image elements and deriving therefrom a signal train by a predetermined orderly sequence of scanning. The image may then be reproduced at a remote location by the same orderly sequence of scanning.

The reproduction of images in color may be accomplished by additive methods. Such systems are well known in the optical art. Additive methods produce natural color images by breaking down the light from an object into a predetermined number of selected primary or component colors which are three in number, producing a tricolor system, but occasionally may be more or less than three, depending upon the degree of fidelity of color representation which is desired.

It follows, then, that color images may be transmitted by electricity by analyzing the light from an object into not only its image elements, but by also analyzing the light from the elemental areas of the object into selected primary or component colors and deriving therefrom a signal train representative of each of the selected component colors. A color image may then be reproduced at a remote point by appropriate reconstruction from the component color signal trains.

Transmission of color images may be accomplished by either of two fundamental systems of multiple image transmission. These two systems have become widely popularized as the sequential and simultaneous systems of color image transmission.

The sequential system transmits at any one time only one component color signal train, and transmits a portion of each of the selected component color signal trains in predetermined sequence with other selected component color signal trains.

The simultaneous type system transmits all component color signal trains simultaneously through appropriate signal channels.

The equipment employed for converting light from an object into a signal train is commonly known as the television camera or image pickup device. Image pickup tubes may take various forms. An image orthicon camera is shown and described in an article entitled "Image Orthicon Camera" by R. D. Kell and G. C. Sziklai in the "RCA Review" for March, 1946.

In the transmission of images by the sequential system, the camera may have a single image pickup tube such as, for example, the so-called image orthicon, which is exposed in succession to images giving color separation corresponding to the various selected component colors. During the time interval that the camera tube is exposed to each color component image, the mosaic electrode of the camera tube is concurrently scanned to enable the transmission of signals representing the corresponding color separation image.

For the development of the simultaneous type color television signals, there has been proposed the employment of a color camera utilizing three complete and independent camera tubes, each of which separates from the light of the object being scanned a different selected component color image. Although satisfactory results can be obtained from such a system, disadvantages, including unusual bulk, expense and difficulty in registration, at once become apparent.

The aforementioned disadvantages have been largely eliminated in the proposed simultaneous all-electronic color television system involving a cathode ray scanning tube which forms a single scanning raster. The scanning raster is projected on a color film from which selected component color light sensitive devices transform the resultant light into the several separate signal trains, each representative of a selected component color. A system of this nature is referred to as the "flying spot" system. A typical flying spot system is shown and described in an article "Simultaneous All-Electronic Color Television," beginning on page 459 of the "RCA Review" for December, 1940.

It becomes apparent, however, that the flying spot arrangement, which is very satisfactory for the conversion of planar color images into appropriate signal trains, is not readily adaptable to pickup requirements where the object is three-dimensional, and particularly when illumination is required at the position of the object or when the scene to be transmitted includes important light sources.

According to this invention, a signal scanning raster is employed to simplify registration problems. The scanning raster is divided into a plurality of scanning rasters which are positioned in accurate registry on a plurality of light sensitive mosaic electrodes upon which is also positioned the component color separation image of the object being scanned.

A primary object of this invention is therefore to provide an improved color television system.

Another object of this invention is to provide an improved simultaneous type color television camera free from registration problems.

Other and incidental objects of the invention will be apparent to those skilled in the art from a readying of the following specification and an inspection of the accompanying drawing in which.

Figure 1:
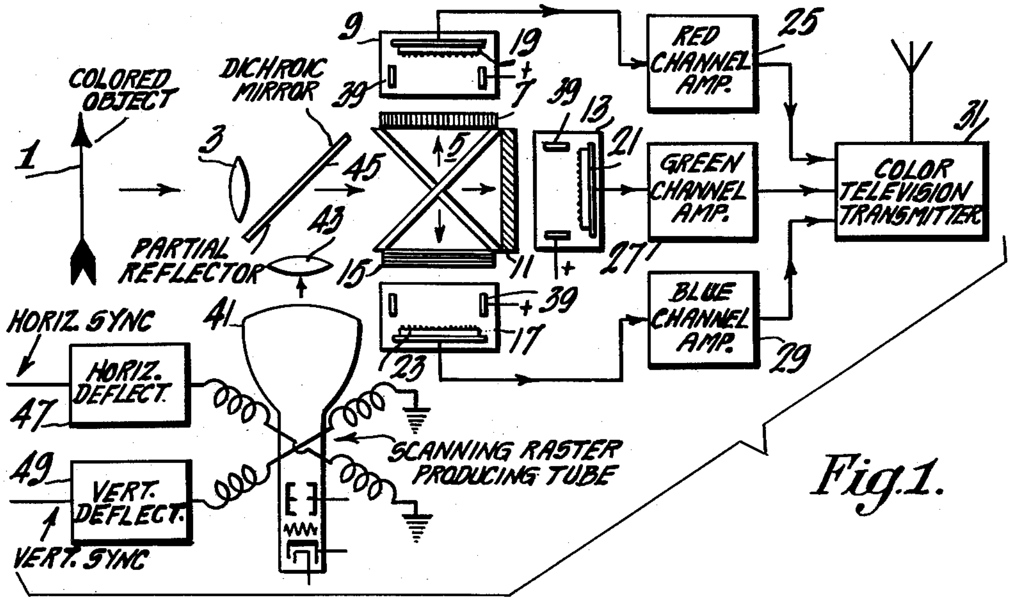
Figure 1 illustrates by block diagram one form of this invention.

Turning now in more detail to Figure 1, light from a colored object 1 is transmitted through lens 3 to a crossed dichroic mirror arrangement 5 which is used in this form of the invention as a light splitter to cause the red portions of the colored object 1 to be reflected upward through a red filter 7 to tube 9.

The green portions of colored object 1 are directed through green color filter 11 to tube 13, while the blue portions of colored object 1 are reflected downward through a blue filter 15 to tube 17.

The crossed dichroic mirror 5 is illustrated as one form of this invention, however, half-silvered mirrors may be substituted in accordance with the well-known arrangement of dividing light into its selected component colors in connection with associated color filters.

The detailed theory and operation of dichroic reflectors is well shown and described in a paper by G. L. Dimmick entitled "A New Dichroic Reflector and Its Application to Photo Cell Monitoring Systems," appearing in the "Journal of the Society of Motion Picture Engineers," vol. 38, January, 1942, beginning on page 36.

An efficient arrangement of dichroic reflectors for employment in connection with color television systems and the like is shown and described in the co-pending U. S. application of Alfred C. Schroeder entitled "Component Color Separator," Serial No. 731,647, filed February 28, 1947.

The theory of operation of a dichroic mirror may be readily understood when it is remembered that thin films of some materials are selective in their ability to reflect and transmit light. A soap bubble or a layer of oil on water are perhaps the most commonly experienced examples of this type. A thin film of gold is quite transparent to green light and shows strong selective reflection for the red and yellow region. Many aniline dyes appear to have one color when viewed by reflected light and another color when viewed by transmitted light. The material possesses what is known as a surface color, and the transmitted light gets its color by being deprived of certain rays by reflection at the surface, and certain others by absorption in the interior.

The red component color image of colored object 1 is focused on the mosaic electrode 19 of tube 9. The green component color image of colored object 1 is focused on the mosaic electrode 21 of tube 13. Likewise, the blue component color image of colored object 1 is focused on the mosaic electrode 23 of tube 17.

Although color filters 7, 11 and 15 are shown employed in connection with the dichroic mirror arrangement, it is not necessary that they be included because of the efficient color image separation characteristics of the dichroic mirror arrangement.

Channel amplifiers 25, 27 and 29 are connected respectively to mosaic electrodes 19, 21 and 23. The technical characteristics of amplifiers 25, 27 and 29 are well known in the television art and need no further explanation here, except perhaps to indicate that they should, for good performance, be of the type having relatively wide band pass characteristics.

Amplifiers 25, 27 and 29 are connected to color television transmitter 31 in the usual manner.

The operation of tubes 9, 13 and 17 may best be explained by reference to both Figures 1 and 2.

Figures 2, 3:
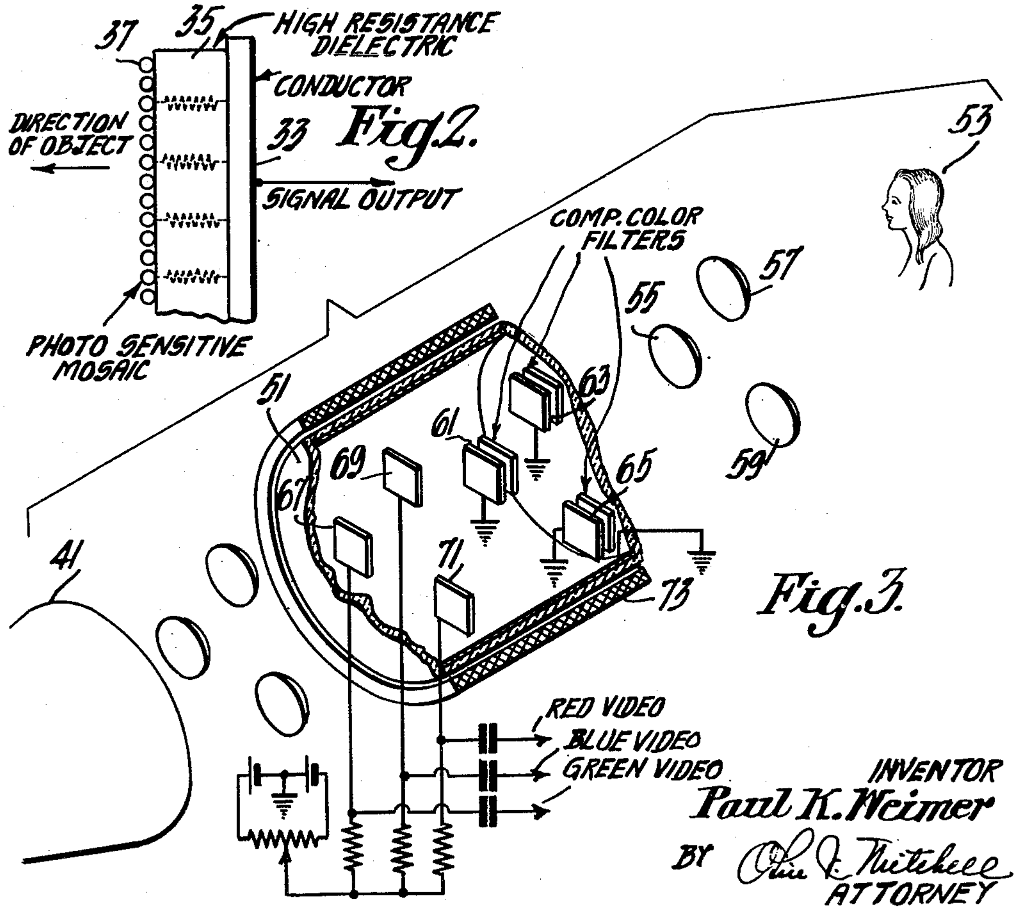
Figure 2 illustrates schematically by a greatly enlarged cross-section the light sensitive mosaic electrode employed in one form of this invention.
Figure 3 shows in perspective another form of this invention.

An enlarged section of the mosaic electrodes 19, 21 and 23 is shown in Figure 2. A conductor 33, which provides the output signal, contains a high resistance dielectric 35 on its front surface A photosensitive mosaic surface is accomplished by forming globules 37 of mutually insulated photosensitive materials.

A wide variety of constructions and materials can be employed to fulfill the conditions of photosensitivity and insulation required of the mosaic electrodes 19, 21 and 23. A very thin coating of cesium can be deposited on a thin plate of mica. In depositing, the cesium breaks up into small "islands," leaving the insulating mica between. The insulation of the mica provides the transverse insulation required to preserve the charge deficiency on each cesium island independently of the deficiency on the other islands. In the practice of this form of this invention, the high resistance dielectric 35 is substituted for the mica. The globules 37 are imperceptible to the unaided human eye, and are usually less than 0.001 inch in diameter.

When an image such as the image of colored object 1 is projected on the photosensitive mosaic of globules 37, their photoelectric properties cause them to release electrons from their surface. The released electrons are attracted to the positively charged electrodes 39 in each of the tubes 9, 13 and 17. The transverse insulation characteristic of the surface (provided by the space between globules 37 and the high resistance characteristic of the dielectric 35) tends to preserve the configuration of the charge.

Although the charge of the globules 37 gradually leaks off through the high resistance of the dielectric 35, the continuation of the light of the image on the globules 37 tends to produce a voltage thereon with respect to plate or conductor 33, consequently, an electrostatic charge image or an electrical equivalent of the optical image is established in the photosensitive mosaic surface.

Dielectric 35 is, of course, very thin, thus causing a leakage path to the conductor, which is much more effective than the leakage path to adjacent globules. The dielectric may also be constructed such that its resistance horizontally, as shown in the drawing, is lower per unit length of material than its resistance in a vertical direction.

This in itself is not sufficient to produce the required signal output. However, if a scanning agent such as a spot of light is caused to scan the photosensitive mosaic surface in an orderly sequence, the charge on the photoelectric globules 37 will be erased, so to speak, thus causing an abrupt change or alteration in the charge on each globule as the scanning agent traverses each globule. This abrupt alteration of the charge on each element or globule, the amount of which is governed by the original charge on the globule, is transmitted by capacitive coupling to the conductor 33. The scanning of the spot of light over the photosensitive mosaic surface therefore produces a train of signals representative of the instantaneous charge of the globules 37 of the photosensitive mosaic.

The cathode ray beam scanning raster producing tube 41 of Figure 1 is employed to produce an optical scanning raster which, for this form of the invention, is a blank scanning raster. The image of the scanning raster which is produced in tube 41 is focused through lens 43 to a partial reflector 45 and onto the mosaic electrodes 19, 21 and 23 of each of the tubes 9, 13 and 17.

The scanning raster producing tube 41 is well known in the art, as well as its associated horizontal deflection circuit 47 and vertical deflection circuit 49. A typical scanning raster producing tube and circuit arrangements are shown and described in the article referred to above, entitled "Simultaneous All-Electronic Color Television," beginning on page 459 of "RCA Review" for December 1946.

It will be seen that the serious problem of obtaining registration is largely eliminated because of the single raster employed. The registry is simply a problem of optics, and once established, can be maintained in accurate relationship.

Although one form of device for converting optical images into electrical images is shown and described in Figures 1 and 2, it is given by way of example.

Broadly, the use of an optical image, together with a scanning light spot or other means to simultaneously charge a target, with another arrangement for discharging the target, is shown in other suitable forms in the following U. S. patents: 2,212,923, H. Miller, August 27, 1940; 2,199,438, Lubszynski, May 7, 1940; 2,227,015, Schlesinger et al., December 31, 1940, and 2,172,727, Bruche et al., September 12, 1939.

Turning now in detail to Figure 3, there is shown another form of this invention involving a single envelope 51 containing three separate selected component color image conversion arrangements.

Light from the object 53 is transmitted through lenses 55, 57 and 59 to three separate color filters, as indicated. Behind the color filters are located the mosaic electrodes 61, 63 and 65.

In accordance with the well known procedure of energy amplification in image tube arrangements, the electrical images on mosaic electrodes 61, 63 and 65 are transferred by focusing coil 73 to targets 67, 69 and 71, respectively.

A detailed explanation of such operation may be found in connection with descriptions of theory and operation of the image tube, such as, for example, in an article entitled "Electron Optics of an Image Tube," by G. A. Morton and E. G. Ramberg in "Physics" for December 1936, or, for example, in the description of the theory and operation of the image orthicon in an article entitled "The Image Orthicon, A Sensitive Television Pickup Tube" by Albert Rose, P. K. Weimer and H. B. Law.

The cathode ray scanning raster producing tube 41 of Figure 3 divides its scanning raster into three separate scanning rasters, which are projected on electrodes 67, 69 and 71 to form electron images thereon of the scanning raster.

The electrodes 67, 69 and 71 are conducting and transparent and produce a signal through the several channels indicated in a manner similar to that described above for the operation of the circuit arrangements shown in Figure 1.

Electron multipliers may be used in any of the arrangements described above for intensification of the signal output. Image sections may be employed in the tubes 9, 13 and 17 of Figure 1.

Various arrangements for the prevention of shading may be included to improve results obtained by the practice of this invention.

Having thus described the invention, what is claimed is:

1. The method of developing independent electrical signal trains, each signal train representative of a different selected component color image of an object, comprising the steps of dividing the light from said object into a plurality of selected component color images of said object, converting each of said selected component color images into space separated electrical image representations, developing a primary flying spot scanning raster, forming a secondary scanning raster from said primary flying spot scanning raster for each of said selected component color images, converting each of said secondary scanning rasters into electrical representations, combining an electrical representation of said secondary scanning raster in like registry with each of said electrical image representations and deriving from said combination a signal train for each of said selected component color images.

2. The method of developing color television signals, comprising the steps of dividing the light from the object being televised into a plurality of selected component color images, converting each of said selected component color images into an electrical image representation thereof, optically forming a flying spot raster, developing an electrical representation of said flying spot raster in each of said electrical image representations and in like relative position in each electrical image representation and deriving from said combination of said electrical representation of said flying spot rasters and said electrical image representations a signal train for each of said selected component color images.

3. The method of developing simultaneous type color television signals comprising the steps of optically dividing the light from the object being televised into three selected component color images, converting each of said selected component color images into an electrical image representation thereof, optically forming a flying spot raster, forming an optical image of said flying spot raster at each of said component color images, developing an electrical representation of said flying spot raster image in the corresponding electrical image representations and in like relative position in each electrical image representation and deriving from said combination of said electrical representation of said flying spot rasters and said electrical image representations selected component color images.

4. A color television image pick up system comprising in combination a plurality of image responsive electrodes, an optical system positioned in cooperative relationship with said electrodes and arranged to project one different selected component color image of the same object on each of said electrodes, and a single cathode ray device also positioned in cooperative relationship with said electrodes to project on each of said electrodes a scanning light spot deflected to traverse the target of each in a predetermined scanning raster and in optical registry with each other with respect to the images.

5. A color television image pick up system comprising in combination a plurality of image responsive target electrodes, an optical system positioned in cooperative relationship with said electrodes and arranged to project one different selected component color image of the same object on each of said electrodes, a cathode ray device also positioned in cooperative relationship with said electrodes to project on each of said electrodes a scanning light spot deflected to traverse the target in a predetermined scanning raster, and wherein each of said electrodes consists of a mosaic of light sensitive elements and a signal plate, a resistance and a capacity connected between said mosaic and said signal plate.

6. A color television camera comprising in combination, means for producing a plurality of different selected component color optical images of an object to be televised, means for converting each of said optical images into electrical images, means for producing a scanning light spot, and means for optically projecting simultaneously, said scanning light spot on to each of said optical images in image registry to develop separate selected component color representative signal trains.

PAUL K. WEIMER.

REFERENCES CITED

The following references are of record in the file of this patent:

UNITED STATES PATENTS

| Number | Name | Date |
|---|---|---|
| 2,099,889 | Ives | Nov. 23, 1937 |
| 2,227,018 | Schlesinger | Dec. 31, 1940 |
| 2,256,300 | Van Mierlo | Sept. 16, 1941 |
| 2,312,792 | Bamford | Mar. 2, 1943 |
| 2,314,648 | Lubszynski | Mar. 23, 1943 |
| 2,335,180 | Goldsmith | Nov. 23, 1943 |
| 2,389,646 | Sleeper | Nov. 27, 1945 |

FOREIGN PATENTS

| Number | Country | Date |
|---|---|---|
| 451,959 | Great Britain | Aug. 14, 1936 |